United States Patent [19]

Johnson

[11] 4,179,965

[45] Dec. 25, 1979

[54] GUIDE FOR PORTABLE POWER TOOL

[76] Inventor: F. Walter Johnson, 2920 Floyd St., Sarasota, Fla. 33579

[21] Appl. No.: 885,975

[22] Filed: Mar. 13, 1978

[51] Int. Cl.$^2$ .................................................. B27B 9/04
[52] U.S. Cl. .................................... 83/745; 83/471.3; 83/486.1
[58] Field of Search ............ 33/112; 30/371; 83/745, 83/471.3, 486.1; 269/1, 270–279

[56] References Cited

U.S. PATENT DOCUMENTS

| 905,265 | 12/1908 | Wise | 83/745 |
|---|---|---|---|
| 2,773,523 | 12/1956 | Hopla | 83/745 |
| 2,823,709 | 2/1958 | Konieczka | 83/745 |
| 3,273,613 | 9/1966 | Craven | 83/745 X |
| 3,829,231 | 8/1974 | Hamilton | 83/745 X |

*Primary Examiner*—Donald R. Schran
*Attorney, Agent, or Firm*—Hauke and Patalidis

[57] ABSTRACT

A guide for a portable power tool such as a circular saw, a saber saw, a router, or the like, for effecting a straight cut in a work. The guide is clampable upon the work, such as a wood plank, and is provided with an angularly adjustable bracket forming a straight edge for guiding the power tool. An adjustable and clampable gage is supported by the bracket, the gage having a reference edge surface adjustably movable away or towards the straight edge of the bracket to define a distance from the bracket edge equal to the distance separating the guiding edge of the power tool support platform from the cutting path of the power tool. When it is desired to effectuate a cut along a scribed line on the work, the straight edge of the bracket is located along the scribed line, and a second line is marked at the location of the reference edge surface of the gage. The guide is clamped in position with the straight edge of the bracket aligned with the second line, and the cut effected with a power tool is exactly and precisely along the first line.

8 Claims, 4 Drawing Figures

U.S. Patent
Dec. 25, 1979
4,179,965
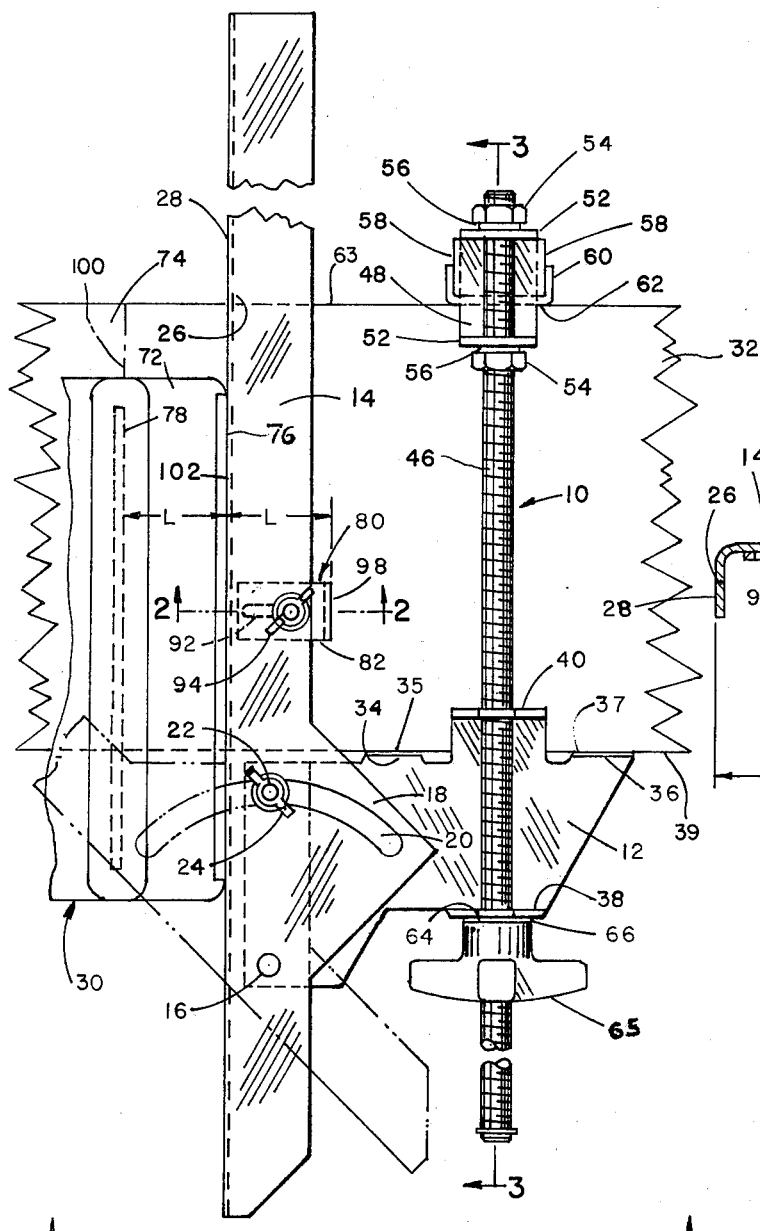
Fig. 1
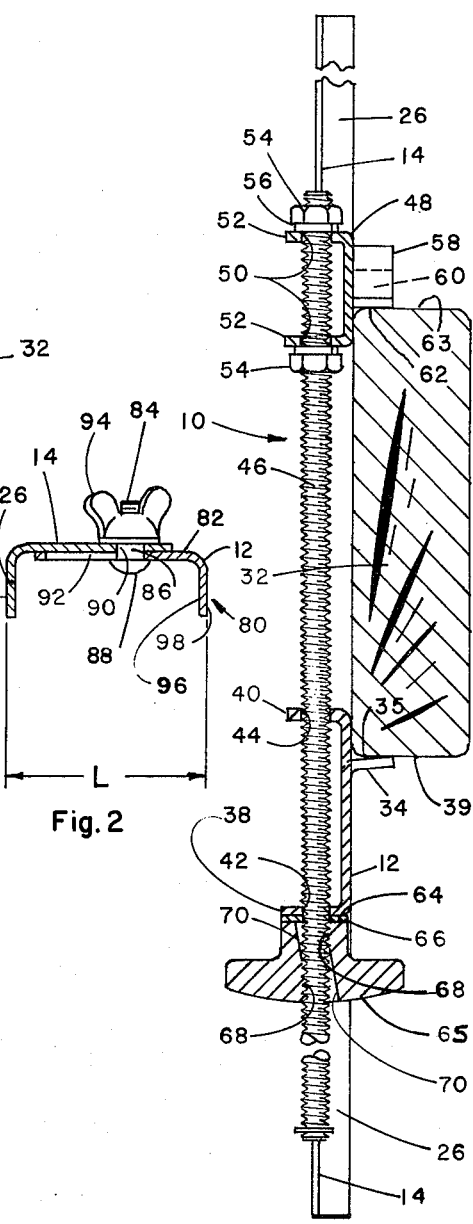
Fig. 2
Fig. 3
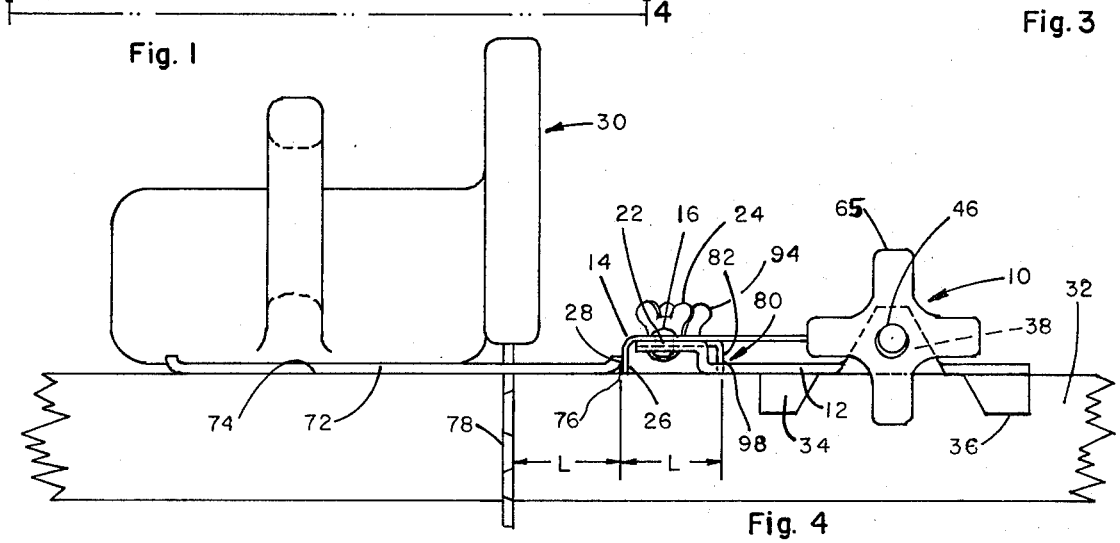
Fig. 4

GUIDE FOR PORTABLE POWER TOOL

BACKGROUND

The present invention relates to a guide for power hand tool for effecting a straight cut on the work at a predetermined position.

Devices are known which may be clamped to a piece of material such as a wooden plank or a 2×4, so as to provide a guiding edge for power portable tools mounted on a support shoe. Such devices are generally time consuming in setting up, and they must generally be set up by using the power tool on its support shoe as a guiding means for locating the position of the guiding edge of the guiding device, the support shoe having a straight edge disposed a predetermined fixed distance from the slot through which the saw blade, for example, projects through the shoe.

It has also been known in the past to provide the support shoe of a power hand tool, such as a circular saw or sabre saw, with an adjustable laterally projecting bracket on the end of which is mounted a straight edge slidably engaging the edge of the piece of stock to be cut. Such guiding means are awkward to use and inaccurate, and they require that the edge of the work engaged by the bracket straight edge be accurate and straight in order to effectuate a straight cut in the work.

SUMMARY

The present invention provides a guide which can be quickly and accurately clamped to a workpiece, and which provides an accurate guide for a power hand tool used for effecting a cut in the workpiece, which can be quickly unclamped from the work, and shifted to another position and reclamped on the work without complicated adjustment or manipulation. In addition, the present invention provides an accurate gaging means for clamping the guide in a precise position permitting to effectuate a cut in the workpiece at a precise location, without complicated calculations or setup.

The invention accomplishes its purposes by providing a simple angularly adjustable guide clampable on a workpiece by means of a fast-acting clamping mechanism and provided with a guide member having an adjustable gage for determining the exact position of the guide member edge for effecting a cut in the workpiece at a desired location.

The diverse advantages and objects of the present invention will become apparent to those skilled in the art when the following description of an example of the best mode contemplated for practicing the invention is read in conjunction with the accompanying drawing wherein:

BRIEF DESCRIPTION OF THE DRAWING

FIG. 1 is a top plan view of a clampable guide according to the present invention;

FIG. 2 is a partial section along line 2—2 of FIG. 1;

FIG. 3 is a longitudinal section along line 3—3 of FIG. 1; and

FIG. 4 is an end view from line 4—4 of FIG. 1.

DETAILED DESCRIPTION OF THE PREFERRED EMBODIMENT

Referring to the drawing, and more particularly FIGS. 1 and 3-4 thereof, an example of guide 10 according to the present invention comprises a plate 12 made of steel for example, on a side of which is pivotably mounted a straight edge bracket 14, also made of steel for example, by way of a pivot pin or rivet 16. The straight edge bracket 14 is provided with a laterally extending integral substantially triangular portion 18 provided with an arcuate slot 20, FIG. 1, through which passes a fixed bolt 22, pressed, welded or otherwise fastened through an appropriate aperture in the plate 12. A wing nut 24 threads on the end of the bolt 22, and permits to clamp the straight edge bracket 14 relative to the plate 12 in any appropriate angular position, around the axis of the pivot pin 16, from the position shown in full line at FIG. 1 to the position shown in phantom line.

The straight edge bracket 14 is substantially L-shaped in cross-section, as best shown at FIG. 2, and has a flange 26 on a side defining a straight guiding edge 28 for a portable power tool such as the circular saw 30, FIG. 4, when the clampable guide 10 of the invention is clamped in position to a workpiece such as a wooden plank 32, or the like. For that purpose, the plate 12 has a pair of integral aligned abutment portions 34 and 36, downwardly projecting and forming clamping surfaces 35 and 37, respectively, engageable with a lateral edge 39 of the workpiece 32. The plate 12 is further provided with a pair of upwardly projecting integrally formed ears 38 and 40, each provided with an aperture 42 and 44, respectively, through which freely passes a peripherally threaded rod 46. A channel-shaped clip 48 is adjustably mounted on the end of the threaded rod 46 by being passed through a pair of aligned apertures 50 each disposed in one of the sidewalls 52 of the clip 48, a pair of nuts 54 and lock washers 56 holding the clip 48 in position. The clip 48 is provided with a pair of integrally formed downwardly extending walls 58 over which is spot-welded a U-shaped abutment bracket 60 forming a clamping surface 62 for engagement with the other edge 63 of the workpiece 32.

A fast-acting wing nut or knob 65 is passed over the threaded rod 46 beyond the ear 38 of the plate 12 and has a face 64 which, through the intermediary of a washer 66, engages the outer surface of the ear 38 such as to displace the plate 12 towards the clip 48, thus clamping the workpiece 32 between the clamping surfaces 35 and 37 of the plate 12 and the clamping surface 62 dependent from the clip 48. For that purpose, the fast-acting wing nut or knob 65 has a longitudinal partially threaded bore 68, FIG. 3, threadable on the peripheral thread of the threaded rod 46, and a clearance bore 70, whose axis is disposed at an angle, such as 10° for example, to the axis of the threaded bore 68 and which forms an unthreaded generally cylindrical surface generally diametrically disposed relative to the corresponding threaded surface of the partially threaded bore 68. In such manner, when the knob 65 is rotated, with its axis coinciding with the axis of the threaded rod 46 as a result of the engagement of the partially threaded bore 68 with the thread on the periphery of the threaded rod 46, the clamping surfaces 35 and 37 are drawn toward the clamping surface 62, and the guide 10 is clamped over the workpiece 32. When it is desired to unclamp the guide 10, the wing nut or knob 65 is rotated in an opposite direction, and as soon as relatively loose, can be swung with its longitudinal axis at an angle relative to the axis of the threaded rod 46 corresponding to that of the bore 70 relative to the axis of the pivotally threaded bore 68, thus disengaging the partial threaded bore 68 from engagement with the peripheral thread on the threaded rod 46, with the result that the knob 65 can be rapidly displaced to any position to adjust the clamping width of the guide 10 of the invention to conform to any stock width.

In the setup illustrated in the drawing, the straight edge bracket 14 is disposed relative to the plate 12, with the wing nut 24 drawn tight and the guide 10 clamped in a position over a workpiece 32, such as a wooden plank, for effecting a cut at a right angle to the parallel edges 35 and 63 of the work 32. The cut is ready to be effected by a circular saw 30, for example, FIG. 4, which is provided with a platform or shoe 72 adapted to slidably engage the top surface 74 of the work 32. The shoe 72 has an edge 76 which, during a cutting operation by the circular saw blade 78, is in sliding engagement with the guiding surface 28 of the straight edge bracket 14. In order to determine with accuracy the position at which the clampable guide 10 is to be clamped on the workpiece 32, an adjustable gage is mounted on the straight edge bracket 14. The gage 80 comprises an L-shaped clip 82 which, as best shown at FIG. 2, is mounted below the straight edge bracket 14 by means of a bolt 84 having a square body portion 86 proximate its head 88 engaged in a square aperture 90 formed through the surface of the straight edge bracket 14. The edges of a slot 92 formed in the clip 82 engage opposite surfaces of the bolt square body portion to permit the clip 82 to be laterally displaceable along a straight line perpendicular to the guiding face 28 of the straight edge bracket 14, and the gage clip 82 is clamped in any appropriate position by means of a wing nut 94 threading on the end of the bolt 84 projecting to the top surface of the bracket 14. The clip 82 has a downwardly turned portion 96 defining a reference surface 98.

The gage 80 is adjusted only once for a given portable hand saw, for example, by loosening the wing nut 94 and sliding the clip 82 laterally such that the distance L between the reference surface 98 and the guiding surface 28 of the straight edge bracket 14 is equal to the distance L separating the side of the saw blade 78, FIG. 4, from the side surface 76 of the saw shoe 72. It will be appreciated that once the setting of the gage 80 is effected for a given tool, the guide 10 of the invention can be repeatedly used as a guiding means for that tool, such as the circular saw 30, every time the tool is used.

If it is desired to cut the workpiece 32 at a line 100, FIG. 1, the line 100 is first scribed, in the usual manner, on the top surface 74 of the workpiece and the guide 10 of the invention is placed over the workpiece 32 with the edge guide surface 28 of the straight edge bracket 14 aligned with the line 100. Using the reference surface 98 of the gage 80 as a guide, a line 102 is scribed on the top surface of the workpiece 32. The guide 10 is then clamped on the workpiece 32 with the edge guide surface 28 of the straight edge bracket 14 aligned with the line 102. Effecting a cut by means of the saw 30 automatically places the cut at line 100, as the distance between line 100 and line 102 is equal to the reference distance L.

It will be appreciated that the guide 10 of the invention is operatively as accurate for making angled cuts as it is for making straight cuts. If instead of making a cut at right angle to the edges of the workpiece 32 it is desired to make a cut at a predetermined angle thereto, a line is scribed on the top surface 74 of the workpiece 32 at the appropriate angle and location. The angular position of the straight edge bracket 14 is then set relative to the plate 12, such that the outer edge surface 28 of the bracket coincide with the scribed line. A second line is scribed corresponding to the reference surface 98 of the gage 80, and the edge surface 28 of the straight edge bracket 14 is angularly and positionally aligned with the second line, with the guide 10 clamped over the workpiece 32 and the straight edge bracket 14 appropriately angularly adjusted, and clamped relative to the plate 12. A cut effected by the saw will fall exactly on the first scribed line.

Preferably, the straight edge bracket 14 is orientable to any angular position from a position whereby the guiding surface 28 of the straight edge bracket is at 90° to the edge of a workpiece 32 to a position wherein the angular relationship is 45°, in order to cover all possible angular cuts.

Having thus described the present invention by way of a typical structural example thereof, modification whereof will be apparent to those skilled in the art, what is claimed as new is as follows:

1. A guide for use with a portable tool having a cutter and a support shoe provided with a guiding edge, said guide comprising a support plate, a straight edge member having a guiding edge mounted on said support plate, and means for clamping said support plate to a workpiece comprising a pair of downwardly turned edge portions in said support plate, a pair of upwardly turned opposite coaxial ears in said support plate, aligned apertures in said ears, a single threaded rod passed through said aligned apertures, a clamping surface on a clamp member mounted on an end of said threaded rod, and a nut threading on said threaded rod and disposed such as to draw said clamping surfaces toward each other, said nut being of the type providing disengagement of its internally threaded bore with the thread of said threaded rod upon pivoting said nut with its axis at an angle to the axis of said single threaded rod.

2. The guide of claim 1 further comprising an adjustable gage mounted on said straight edge member, said adjustable gage having a reference surface adjustably positionable to a predetermined distance from the guiding edge of said straight edge member, said predetermined distance being equal to the distance separating the cutter of said portable tool from the guiding edge of said support shoe.

3. The guide of claim 2 wherein said straight edge member is adjustably angularly movable from a position wherein the guiding edge of said member is at right angle to an edge of said workpiece to a position wherein said guiding edge is at a 45° angle to said workpiece edge.

4. The guide of claim 3 wherein said straight edge member comprises an elongated plate generally L-shaped in cross-section and having a downwardly projecting flange forming said guiding edge.

5. The guide of claim 4 wherein said adjustable gage comprises a clip generally L-shaped in longitudinal section, said clip having a downwardly turned edge parallel to the guiding edge of said straight edge member, a longitudinal slot in said clip main body portion, and a fastener passed through said slot and a corresponding aperture in said straight edge member for adjustably clamping said clip to the lower surface of said straight edge member.

6. The guide of claim 2 wherein said straight edge member comprises an elongated plate generally L-shaped in cross-section and having a downwardly projecting flange forming said guiding edge.

7. The guide of claim 6 wherein said adjustable gage comprises a clip generally L-shaped in longitudinal section, said clip having a downwardly turned edge parallel to the guiding edge of said straight edge member, a longitudinal slot in said clip main body portion, and a fastener passed through said slot and a corresponding aperture in said straight edge member for adjustably clamping said clip to the lower surface of said straight edge member.

8. The guide of claim 1 wherein said straight edge member comprises an elongated plate generally L-shaped in cross-section and having a downwardly projecting flange forming said guiding edge.